United States Patent [19]

Albertson

[11] 4,100,756
[45] Jul. 18, 1978

[54] SOLAR POWERED ABSORPTION REFRIGERATION SYSTEM

[75] Inventor: Clarence Elmo Albertson, Villa Park, Ill.

[73] Assignee: Borg-Warner Corporation, Chicago, Ill.

[21] Appl. No.: 755,329

[22] Filed: Dec. 29, 1976

[51] Int. Cl.² .................. F25B 27/00; F25B 15/00; F24J 3/02
[52] U.S. Cl. ............................... 62/2; 62/148; 62/476; 126/271
[58] Field of Search ............................ 62/2; 148; 324; 476 126/271; 203/1

[56] References Cited

U.S. PATENT DOCUMENTS

| 2,030,350 | 2/1936 | Bremser | 62/2 |
| 2,692,483 | 10/1954 | Hedlund | 62/2 |
| 3,242,679 | 3/1966 | Puckett et al. | 62/2 |
| 3,410,104 | 11/1968 | Hopkins | 62/148 |
| 3,980,071 | 9/1976 | Barber, Jr. | 126/271 |
| 3,985,116 | 10/1976 | Kapany | 126/271 |
| 3,985,117 | 10/1976 | Sallen | 126/271 |
| 3,985,119 | 10/1976 | Oakes, Jr. | 126/271 |
| 4,028,904 | 6/1977 | Anderson | 62/2 |

Primary Examiner—Lloyd L. King
Attorney, Agent, or Firm—Thomas B. Hunter

[57] ABSTRACT

An absorption refrigeration system utilizes a solar collector in the heat input circuit.

3 Claims, 3 Drawing Figures

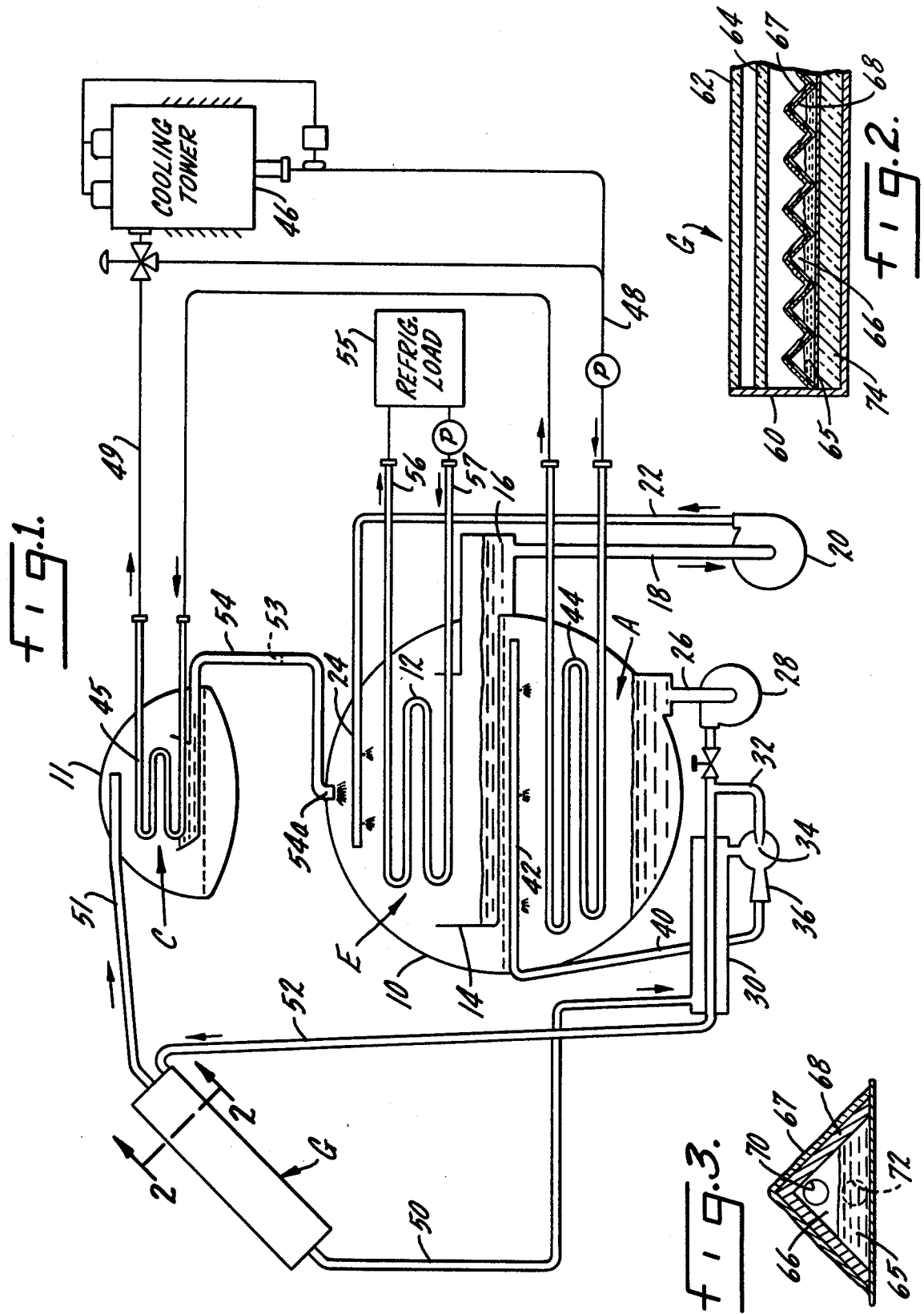

SOLAR POWERED ABSORPTION REFRIGERATION SYSTEM

BACKGROUND OF THE INVENTION

1. Field of the Invention

Absorption refrigeration apparatus utilizing solar energy as the only source of heat input.

2. Description of the Prior Art

U.S. Pat. Nos. 3,980,071; 3,985,116; 3,985,117; and 3,985,119 are representative of different types of solar collectors heretofore known in the art. None of these references suggests an application to an absorption system.

U.S. Pat. No. 3,410,104 describes the construction and operation of a typical absorption refrigeration system powered by steam, although hot water is often used as a source of heat energy to the generator.

SUMMARY OF THE INVENTION

This invention relates to absorption refrigeration means and more particularly of the type using a hygroscopic brine, such as lithium bromide, as the absorber fluid, and water as the refrigerant. The present invention uses a solar collector as the sole source of heat input to drive water vapor from the brine. The collector incorporates features which permit the vapor to be separated from the absorbent solution for circulation to the condenser.

In a typical absorption refrigeration system, a liquid is circulated in a chilling coil forming a portion of an evaporator in which a refrigerant is vaporized to abstract heat from the liquid. The liquid thus chilled is conducted to a refrigeration load, such as one or more remotely located air-conditioning units, the vaporized refrigerant passing to an absorber for absorption by a solution having a strong affinity for the refrigerant. The absorbent solution is diluted by the absorption process, and the heat of solution thus generated is removed by circulating a cooling medium in a cooling coil provided in the absorber. The dilute solution is conducted from the absorber to a generator, where it is heated to evaporate refrigerant, thereby increasing the concentration of the solution. The concentrated solution is returned to the absorber, and the evaporated refrigerant is liquified in a condenser from which it is returned to the evaporator to complete the absorption refrigeration cycle. The evaporator and the absorber are maintained at substantially lower pressures than the generator and the condenser. Water is frequently used as the refrigerant, the chilled fluid and the cooling medium, a suitable source of heat in the generator being steam or hot water circulated in a heating coil. When the refrigerant is water, the absorbent solution is typically a hygroscopic brine such as an aqueous solution of lithium bromide or lithium chloride. It is to be noted, however, that a large number of fluids with widely varying characteristics are suitable for use in absorption refrigeration systems.

The absorber cooling coil often conveniently forms a portion of a cooling circuit which also includes a condenser coil, situated in series with the cooling coil, for abstraction heat from the refrigerant evaporated in the generator to reduce it to condensate. The cooling water is conducted from the condenser coil to a remote location where the heat abstracted in the absorber and in the condenser is rejected to ambient air, usually the air out of doors. Alternatively, and where feasible, the cooling water may be drawn from a body of water such as a lake, a stream, an artificial pool or a deep well, and returned thereto, the body of water thus forming a portion of the cooling circuit.

In contrast, the present invention utilizes a solar collector as a means for receiving solar energy for transmission to the brine in order to heat the same to an energized temperature to drive off water vapor. The vapor is then conducted to a condenser where the vapor is cooled and condensed prior to being transferred to the evaporator.

DESCRIPTION OF THE DRAWINGS

FIG. 1 is a simplified schematic diagram showing the various components in an absorption refrigeration system which is representative of the type of system for which the solar collector of the present invention may be appropriately used;

FIG. 2 is a partial cross-section view of a preferred embodiment of the solar collector taken along the plane of line 2—2 of FIG. 1; and FIG. 3 shows a detail of one of the collector troughs.

DESCRIPTION OF A PREFERRED EMBODIMENT

Referring first to FIGS. 1-3, the absorption system of the present invention includes several major components including a pressure vessel or shell 10 in which is located an evaporator section E and an absorber section A. The evaporator comprises a coil 12 positioned above a pan 14 which is adapted to collect unevaporated refrigerant (water) which passes over the coil. Refrigerant is continuously circulated from an evaporator sump 16 through line 18 to the inlet of refrigerant pump 20. The pump 20 circulates refrigerant through line 22 to a spray header 24 above coil 12. The lower portion of the shell 10 forms a sump for the collection of absorbent solution which is circulated through outlet line 26 to absorber pump 28. From there it passes through a solution heat exchanger 30 where it comes into contact with concentrated absorbent solution returning from the solar collector or generator G, as will be described in more detail below. A portion of the solution leaving pump 28 is diverted through line 32 which forms an ejector nozzle 34 in ejector mechanism 36. The concentrated solution in heat exchanger 30 mixes with the solution in line 32 and the mixture is directed through line 40 to a spray header 42 above absorber coil 44. Coil 44 is supplied with a coolant which may be water from cooling tower 46 which flows through line 48 to the coil 44 and then, in series, to coil 45 in condenser C before returning to the cooling tower through line 49. It should be understood that any source of cooling water may be used although it is most common to use air cooled cooling towers in absorption systems of this type.

In the operation of the absorber section, the "thirsty" brine absorbs the water vapor released in the evaporator section and combines therewith to create a more dilute solution which is removed from the absorber section through line 26 and pump 28. A portion of the dilute solution is fed through the solution heat exchanger 30 and then through line 52 to the inlet end of the generator G. The concentrated solution from the generator returns to the solution heat exchanger 30 through line 50.

The water vapor boiled off in the generator passes through line 51 to the condenser C and the vapor condenses on coil 45 which is cooled by cooling tower water. The condensed liquid refrigerant (water) collects in the lower portion of the shell 11 enclosing condenser coil 45 and then flows through line 52, containing orifice 53 to a distributor 54 above the chilled water coil 12. The refrigerant boils and abstracts heat from water (or other secondary coolant) flowing to and from the refrigeration load 55 through lines 56 and 57.

FIG. 2 is a partial cross-secion view of the collector or generator which includes a housing 60 of generally rectangular form which has a pair of spaced glass or other type of radiation transparent panels 62, 64. A series of channels 66 (see also FIG. 3), formed by inverted V-shaped elements 68, extend at an inclined angle, as oriented in the collector, and the solution 65 flows downwardly through the channels toward the solution return line 50 at the outlet end of the collector housing. The upper surface of elements 68 is coated, at 67, with a heat absorbent coating such as black nickel or the like. As the solution 65 flows from the inlet to the outlet end of the collector, a considerable amount of water vapor is released. This vapor flows through openings 70 at the upper end of each channel. The vapor collects at the upper portion of the housing and flows through line 51 to the condenser. The concentrated absorbent solution flows downwardly through the channels and then out through openings 72 at the bottom thereof to be collected and forwarded to the solution heat exchanger through line 50. The bottom of housing 60 may be formed by a panel of insulating material 74 which increases the thermal efficiency of the collector.

While this invention has been described in connection with a certain specific embodiment thereof, it is to be understood that this is by way of illustration and not by way of limitation; and the scope of the appended claims should be construed as broadly as the prior art will permit.

What is claimed is:

1. An absorption refrigeration system comprising: an evaporator, an absorber, a generator and a condenser all connected in a closed, continuous cycle referigeration circuit with relatively concentrated absorbent solution flowing to the absorber to absorb water vapor from the evaporator and relatively dilute absorbent solution flowing from the absorber to the generator to be concentrated with concomitant release of water vapor to be conducted to the condenser, said generator including a solar collector for providing thermal energy to the absorbent solution to be concentrated, said solar collector including a series of inclined channels into which said relatively dilute solution is introduced in such a way that the channels are not completely filled with solution and a vapor space is maintained at the upper portion thereof, the exterior surface of said channels being provided with a solar absorbing surface; means for directing water vapor to said condenser; and means for conducting relatively concentrated absorbent solution to said absorber.

2. A system as defined in claim 1 including at least one solar radiation transparent panel above said channels.

3. A system as defined in claim 1 wherein said solar collector includes a housing having a plurality of fluid conducting channels therein, each channel being formed by an inverted V-shaped member extending the length of said housing, means providing a heat absorbing surface on the exterior of said U-shaped members and at least one solar radiation transparent panel above said channels closing the upper portion of said housing.

* * * * *